(12) United States Patent
Ishii et al.

(10) Patent No.: US 11,631,541 B2
(45) Date of Patent: Apr. 18, 2023

(54) MULTILAYER CAPACITOR

(71) Applicant: TDK Corporation, Tokyo (JP)

(72) Inventors: Daiki Ishii, Tokyo (JP); Eiko Wakata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/207,212

(22) Filed: Mar. 19, 2021

(65) Prior Publication Data

US 2021/0304968 A1 Sep. 30, 2021

Related U.S. Application Data

(60) Provisional application No. 62/994,097, filed on Mar. 24, 2020.

(51) Int. Cl.
| | |
|---|---|
| *H01G 4/30* | (2006.01) |
| *H01G 2/06* | (2006.01) |
| *H01G 4/232* | (2006.01) |
| *H01G 4/248* | (2006.01) |

(52) U.S. Cl.
CPC .............. *H01G 4/30* (2013.01); *H01G 2/065* (2013.01); *H01G 4/232* (2013.01); *H01G 4/248* (2013.01)

(58) Field of Classification Search
CPC .......... H01G 4/30; H01G 2/065; H01G 4/232; H01G 4/248; H01G 4/005; H01G 4/1209; H01G 4/012
USPC ... 361/306.3, 301.4, 321.3, 320, 321.2, 303, 361/321.1
See application file for complete search history.

(56) References Cited

U.S. PATENT DOCUMENTS

| | | | |
|---|---|---|---|
| 6,587,327 B1* | 7/2003 | Devoe ...................... | H01G 4/38 361/309 |
| 2004/0190218 A1* | 9/2004 | Li ............................. | H01G 4/35 361/302 |
| 2005/0057886 A1* | 3/2005 | Mruz ........................ | H01G 4/40 361/306.2 |
| 2006/0039097 A1* | 2/2006 | Satou ....................... | H01G 4/30 361/303 |
| 2008/0019074 A1* | 1/2008 | Heyen ...................... | H01G 4/35 361/301.4 |
| 2008/0043400 A1* | 2/2008 | Fukudome ........... | H05K 1/0231 361/301.4 |
| 2008/0080120 A1* | 4/2008 | Togashi ................... | H01G 4/35 29/25.03 |

(Continued)

*Primary Examiner* — Arun Ramaswamy
(74) *Attorney, Agent, or Firm* — McDermott Will & Emery LLP

(57) ABSTRACT

Disclosed herein is a multilayer capacitor that includes a capacitor layer having a plurality of odd-numbered electrode layers which are positioned at odd-numbered rows and a plurality of even-numbered electrode layers which are positioned at even-numbered rows. The capacitor layer includes a first side surface to which the odd-numbered electrode layers are exposed, a second side surface to which the even-numbered electrode layers are exposed, and a first planar region. The first external terminal covers the first side surface so as to be connected to the odd-numbered electrode layers. The second external terminal covers the second side surface so as to be connected to the even-numbered electrode layers. The first external terminal covers also the first planar region and is connected to the first internal electrode layer through a first via conductor extending in a stacking direction.

16 Claims, 15 Drawing Sheets

(56) References Cited

U.S. PATENT DOCUMENTS

| | | | |
|---|---|---|---|
| 2010/0207710 A1* | 8/2010 | Ziegler | H03H 7/425 |
| | | | 333/204 |
| 2012/0018204 A1* | 1/2012 | Sato | H01G 4/232 |
| | | | 361/321.1 |
| 2015/0021080 A1* | 1/2015 | Lee | H01G 4/30 |
| | | | 361/301.4 |
| 2015/0041198 A1* | 2/2015 | Lee | H01G 2/06 |
| | | | 361/301.4 |
| 2019/0326061 A1* | 10/2019 | Tomizawa | H05K 1/181 |
| 2021/0020374 A1* | 1/2021 | Kim | H01G 2/02 |

* cited by examiner

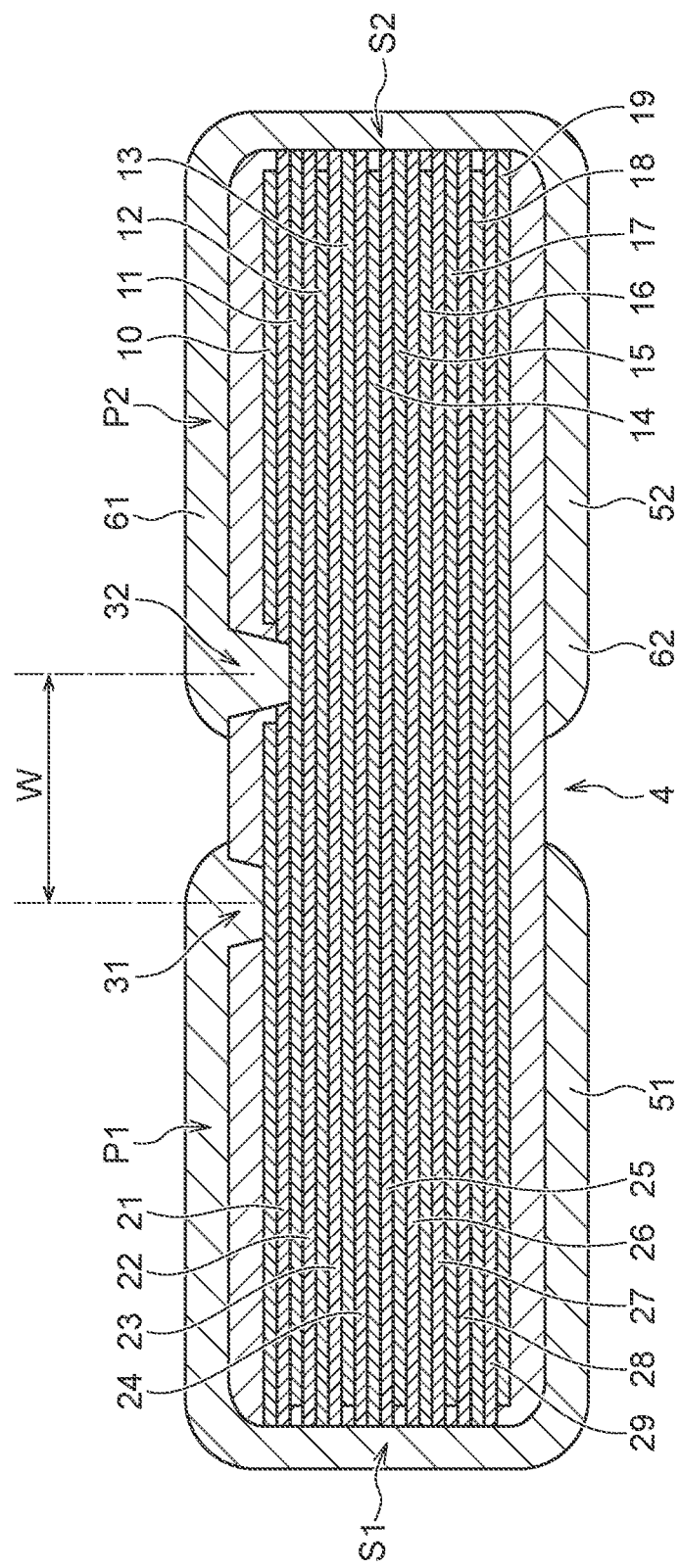

|  | Capacitance [nF] | ESL [pH] | SRF [MHz] |
| --- | --- | --- | --- |
| Comparative Example | 272.2 | 44.8 | 12.2 |
| Example 1 | 272 | 19.2 | 29 |
| Example 2 | 271.6 | 6.4 | 87 |
| Example 3 | 271.6 | 4.2 | 112 |
| Example 4 | 269.4 | 6.4 | 110 |
| Example 5 | 266.7 | 6.4 | 132 |
| Example 6 | 254 | 4.9 | 122 |
| Example 7 | 245 | 6.2 | 126 |
| Example 8 | 258.7 | 6.3 | 118 |

FIG.12

MULTILAYER CAPACITOR

BACKGROUND OF THE INVENTION

Field of the Invention

The present invention relates to a multilayer capacitor.

Description of Related Art

A multilayer capacitor has a structure having a plurality of alternately stacked internal electrode layers and dielectric layers. The odd-numbered internal electrode layers of the plurality of internal electrode layers are connected in common to a first external terminal, and even-numbered internal electrode layers are connected in common to a second external electrode. As a result, a plurality of unit capacitors are connected in parallel between the first and second external terminals.

Typical circuit modules have a plurality of multilayer capacitors with different self-resonant frequencies and mounted on a substrate, and these multilayer capacitors are connected in parallel so that low impedance can be achieved over a wide frequency band. However, using a plurality of capacitors with different self-resonant frequencies disadvantageously increases the number of components.

SUMMARY

It is therefore an object of the present invention to provide an improved multilayer capacitor.

A multilayer capacitor according to the present invention includes: a capacitor layer having a plurality of alternately stacked internal electrode layers and dielectric layers; and first and second external terminals. The plurality of internal electrode layers include: a plurality of odd-numbered electrode layers which are positioned at odd-numbered rows and include a first internal electrode layer; and a plurality of even-numbered electrode layers which are positioned at even-numbered rows and include a second internal electrode layer adjacent to the first internal electrode layer. The capacitor layer includes: a first side surface to which the plurality of odd-numbered electrode layers are exposed; a second side surface to which the plurality of even-numbered electrode layers are exposed; and a first planar region that overlaps the plurality of internal electrode layers in a plan view. The first external terminal covers the first side surface so as to be connected to the plurality of odd-numbered electrode layers. The second external terminal covers the second side surface so as to be connected to the plurality of even-numbered electrode layers. The first external terminal covers also the first planar region and is connected to the first internal electrode layer through a first via conductor extending in a stacking direction of the plurality of internal electrode layers and dielectric layers.

BRIEF DESCRIPTION OF THE DRAWINGS

The above features and advantages of the present invention will be more apparent from the following description of certain preferred embodiments taken in conjunction with the accompanying drawings, in which:

FIG. 1A is a schematic cross-sectional view of a multilayer capacitor according to a first embodiment of the present invention;

FIG. 12 is a table indicating results of examples.

DETAILED DESCRIPTION OF THE EMBODIMENTS

Figure 1B:
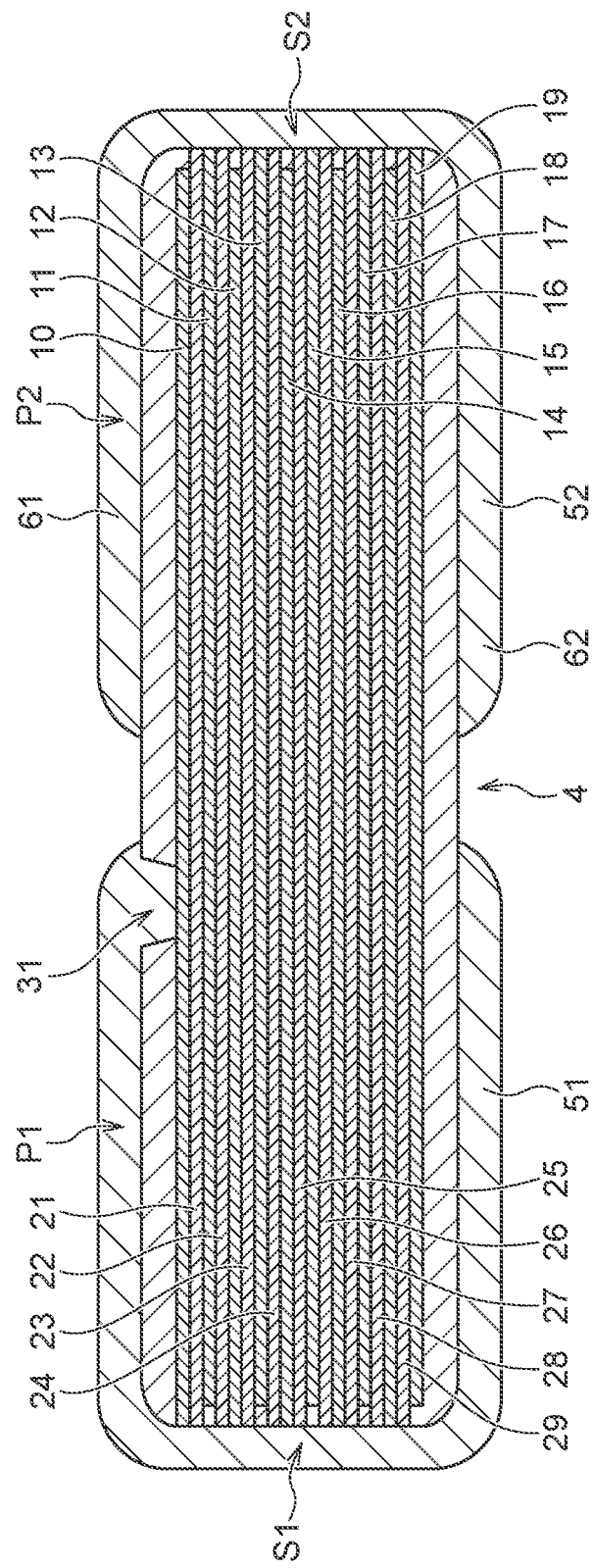
FIG. 1B is a schematic cross-sectional view of a multilayer capacitor according to a modification of the first embodiment.

Hereinafter, preferred embodiments of the present invention will be described in detail with reference to the accompanying drawings. Positional relationships in the following description such as upper, lower, left, and right will be based on those in the drawings unless otherwise noted. Further, dimensional proportions in the drawings are not limited to those illustrated in the drawings. Furthermore, the following embodiments are only examples for describing the invention and the invention is not limited to the following embodiments. Still further, the present invention can be variously modified without departing from the scope of the invention.

FIG. 1A is a schematic cross-sectional view of a multilayer capacitor according to a first embodiment. A multilayer capacitor 1 illustrated in FIG. 1A has a capacitor layer 4 and external terminals 51 and 52. The capacitor layer 4 has a structure in which internal electrode layers 10 to 19 and dielectric layers 21 to 29 are alternately stacked. The upper surface of the capacitor layer 4 is covered with a protective layer 61, and the lower surface thereof is covered with a protective layer 62. The capacitor layer 4 has a side surface S1 to which the internal electrode layers 10, 12, 14, 16, and 18 are exposed, a side surface S2 to which the internal electrode layers 11, 13, 15, 17, and 19 are exposed, and planar regions P1 and P2 overlapping the internal electrode layers 10 to 19 in a plan view. The external terminal 51 covers the side surface S1 so as to be connected to the internal electrode layers 10, 12, 14, 16, and 18. The external terminal 52 covers the side surface S2 so as to be connected to the internal electrode layers 11, 13, 15, 17, and 19. The external terminal 51 also covers the planar region P1 so as to be connected to the internal electrode layer 10 through a via conductor 31 penetrating the protective layer 61. The external terminal 52 also covers the planar region P2 so as to be connected to the internal electrode layer 11 through a via conductor 32 penetrating the protective layer 61 and the dielectric layer 21. The internal electrode layer 10 is removed at a position overlapping the via conductor 32, which prevents contact between the internal electrode layer 10 and the via conductor 32.

The distance between the via conductors 31 and 32 is W, which is preferably small. The distance W is defined by the distance between the centers of the via conductors 31 and 32.

Figure 2:
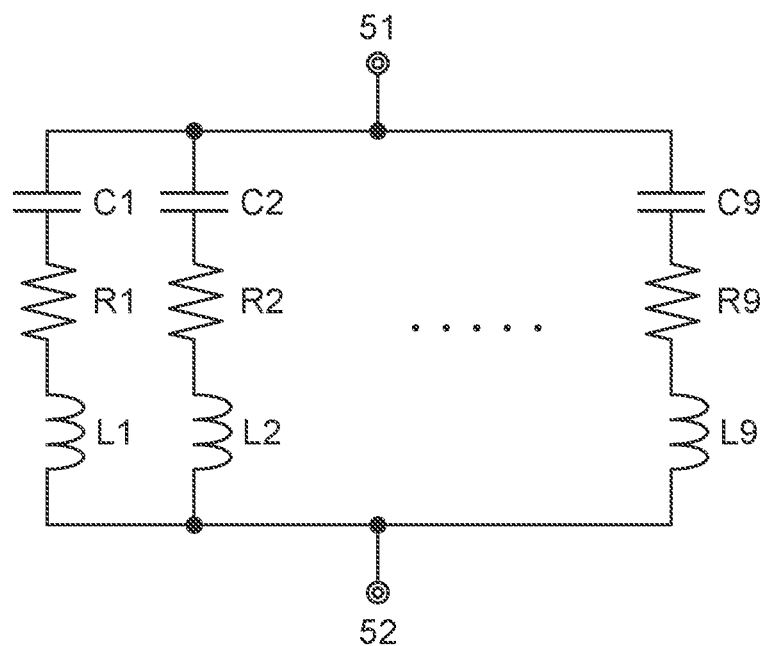
FIG. 2 is an equivalent circuit diagram of the multilayer capacitor illustrated in FIG. 1A.

FIG. 2 is an equivalent circuit diagram of the multilayer capacitor illustrated in FIG. 1A. When capacitors constituted by a plurality of internal electrode pairs sandwiching the respective dielectric layers 21 to 29 are C1 to C9, the capacitors C1 to C9 are connected in parallel between the external terminals 51 and 52. The capacitors C1 to C9 are added in series with parasitic resistances R1 to R9 and parasitic inductances L1 to L9, respectively.

Figure 3:
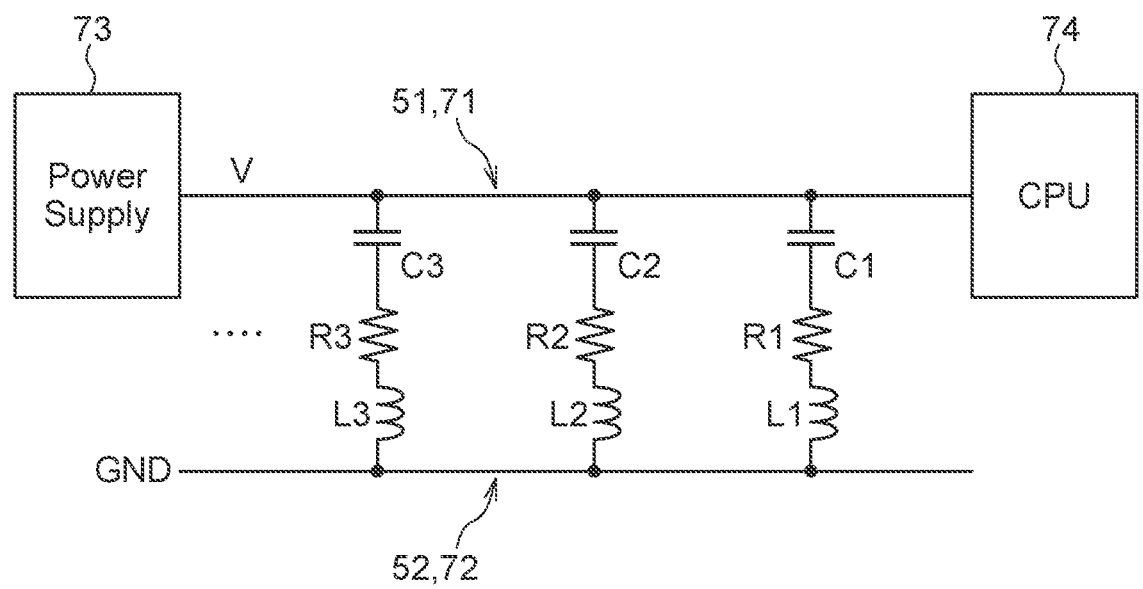
FIG. 3 is a use example of the multilayer capacitor illustrated in FIG. 1A.

FIG. 3 is a use example of the multilayer capacitor illustrated in FIG. 1A. As illustrated in FIG. 3, the external terminal 51 is connected to a power supply line 71, and the external terminal 52 is connected to a ground line 72. The power supply line 71 receives a power supply potential V from a power supply circuit 73. The ground line 72 receives a ground potential GND. The power supply line 71 is connected to a CPU 74.

The power supply line 71 and the ground line 72 are connected respectively to the internal electrode layers 10 and 11 constituting the capacitor C1. The internal electrode layers 10 and 11 are connected respectively to the power supply line 71 and the ground line 72 not only at the side surfaces S1 and S2 of the capacitor layer 4, but also through the via conductors 31 and 32 having the small distance W therebetween, so that the parasitic inductance L1 added to the capacitor C1 is lower than other parasitic inductances L2 to L9. Thus, the capacitor C1 has a high self-resonant frequency. Since the parasitic inductances L2 to L9 added respectively to the other capacitors C2 to C9 are higher than the parasitic inductance L1, the capacitors C2 to C9 have a self-resonant frequency lower than that of the capacitor C1. When the self-resonant frequencies of the capacitors C1 to C9 are represented respectively as SRF1 to SRF9, the following inequality is satisfied:

SRF1>SRF2>SRF3 to SRF9.

When the CPU 74 is connected to the planar region P1 side, the parasitic inductance L1 between the CPU 74 and the capacitor C1 further decreases. In this case, the following inequality is satisfied:

SRF1>SRF2>SRF3>SRF4>SRF5>SRF6>SRF7>SRF8>SRF9.

Thus, in the present embodiment, the plurality of capacitors C1 to C9 having different self-resonant frequencies are connected in parallel, achieving low impedance over wide frequency bands. Typical circuit modules require to use a plurality of parallel-connected capacitors with different self-resonant frequencies to achieve low impedance over wide frequency bands; the present embodiment can achieve this by using one multilayer capacitor.

FIG. 1B is a schematic cross-sectional view of a multilayer capacitor according to a modification of the first embodiment. The multilayer capacitor illustrated in FIG. 1B differs from the multilayer capacitor illustrated in FIG. 1A in that the via conductor 32 is omitted. Thus, in the present invention, it is not necessary to provide both of the via conductors 31 and 32, and one of them may be omitted.

Figure 4:
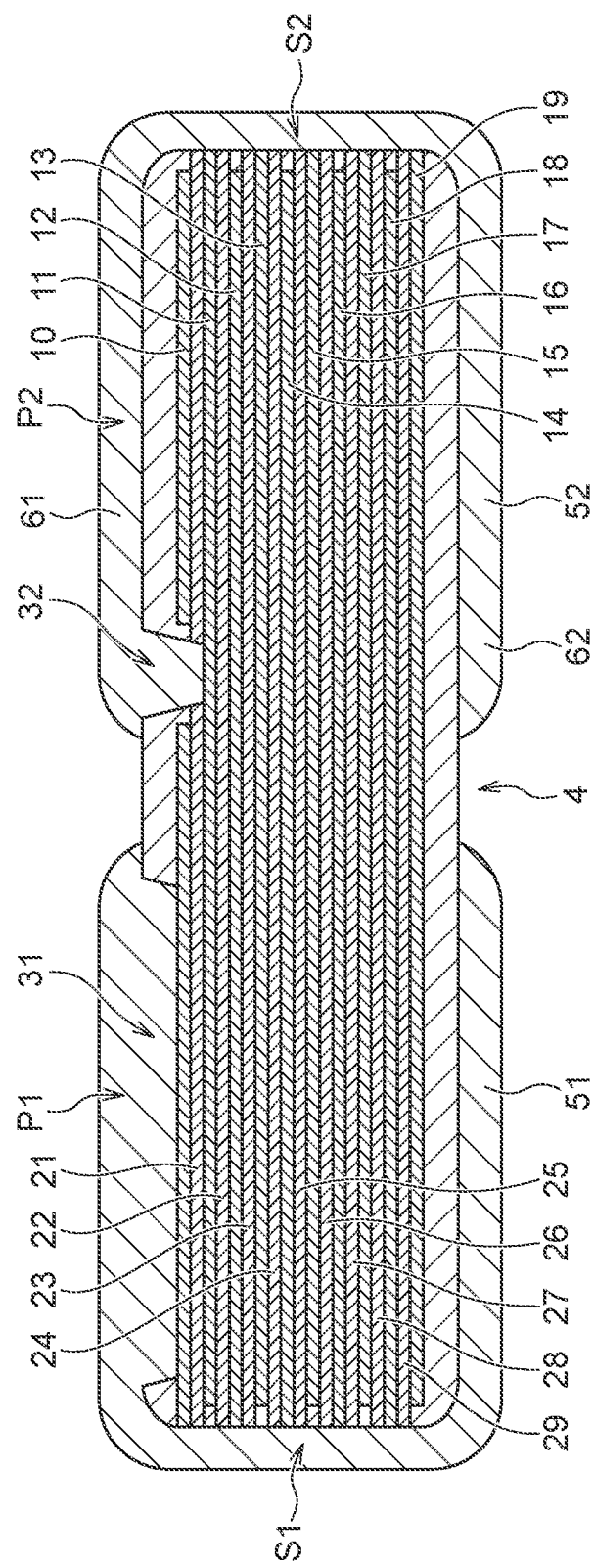
FIG. 4 is a schematic cross-sectional view of a multilayer capacitor according to a second embodiment of the present invention.

A multilayer capacitor according to a second embodiment illustrated in FIG. 4 is featured in that the diameter of the via conductor 31 is larger than that of the via conductor 32. This further reduces the parasitic inductance L1 to further increase the self-resonant frequency SRF1 of the capacitor C1.

Figure 5:
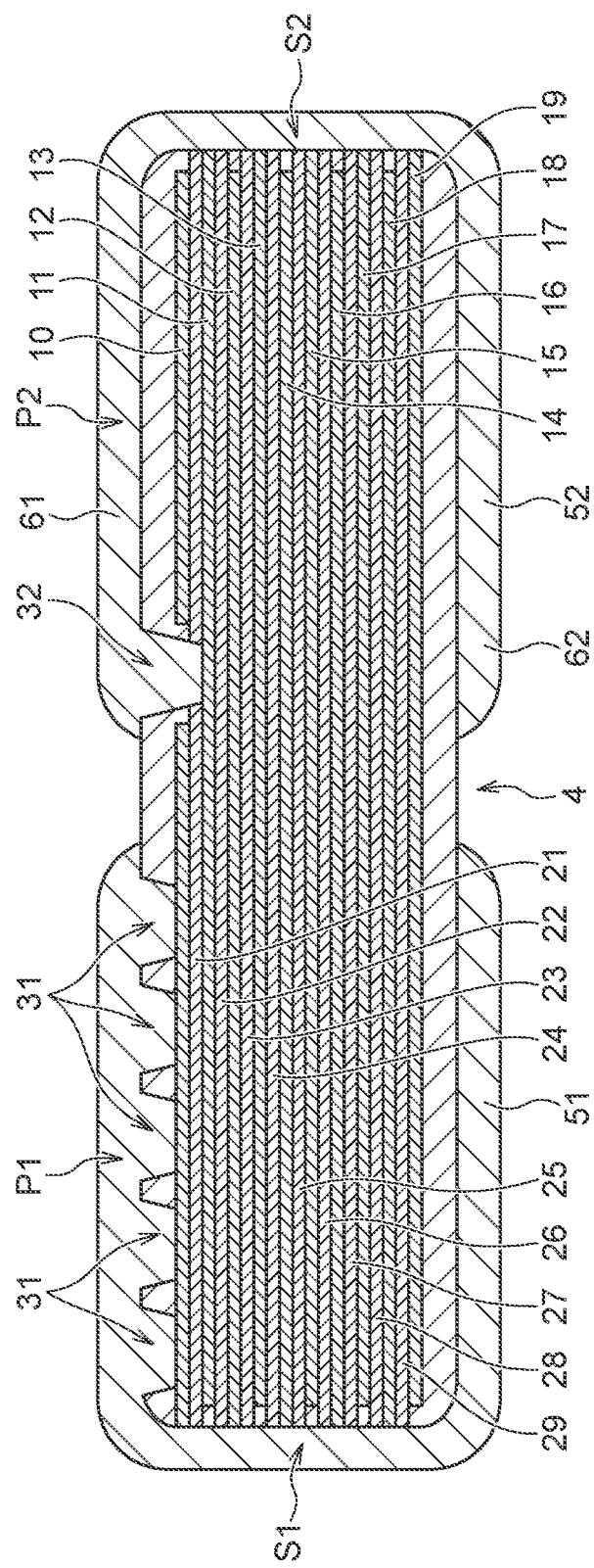
FIG. 5 is a schematic cross-sectional view of a multilayer capacitor according to a third embodiment of the present invention.

A multilayer capacitor according to a third embodiment illustrated in FIG. 5 is featured in that the number of the via conductors 31 is larger than that of the via conductors 32. This further reduces the parasitic inductance L1 to further increase the self-resonant frequency SRF1 of the capacitor C1. In the example of FIG. 5, the number of the via conductors 31 is five.

Figure 6A:
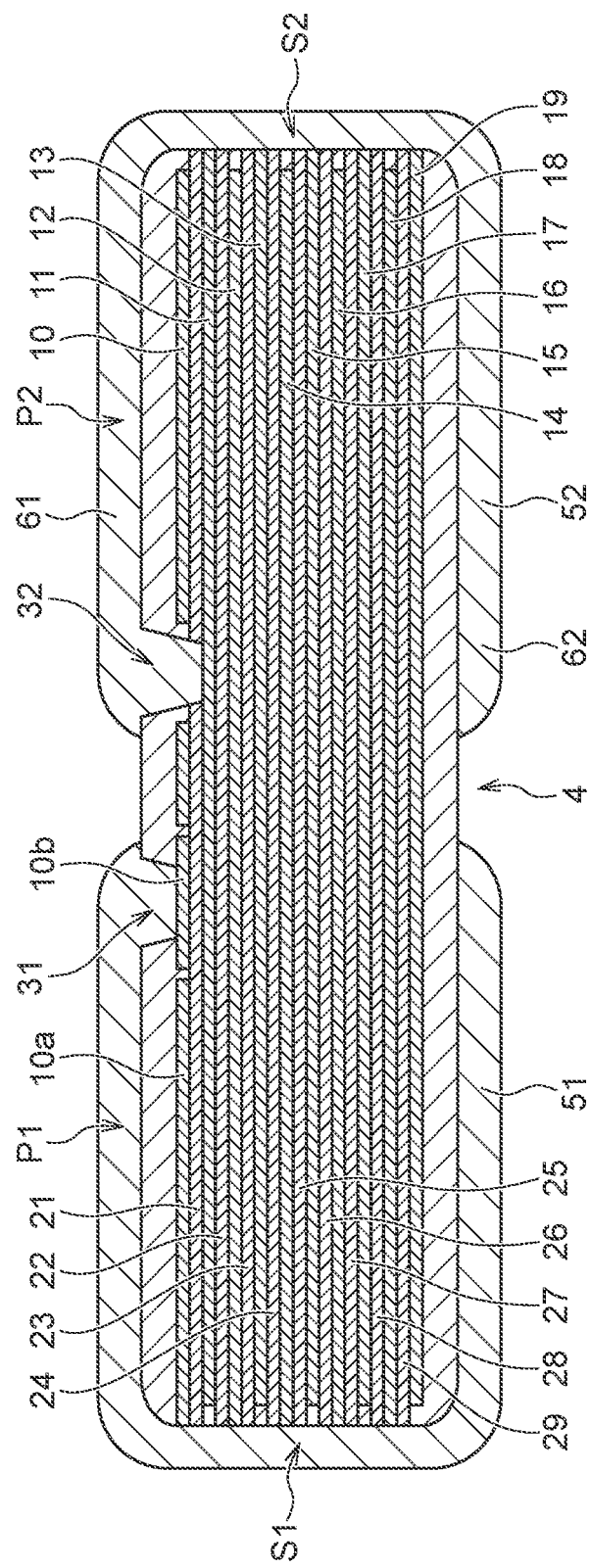
FIG. 6A is a schematic cross-sectional view of a multilayer capacitor according to a fourth embodiment of the present invention.
Figure 6B:
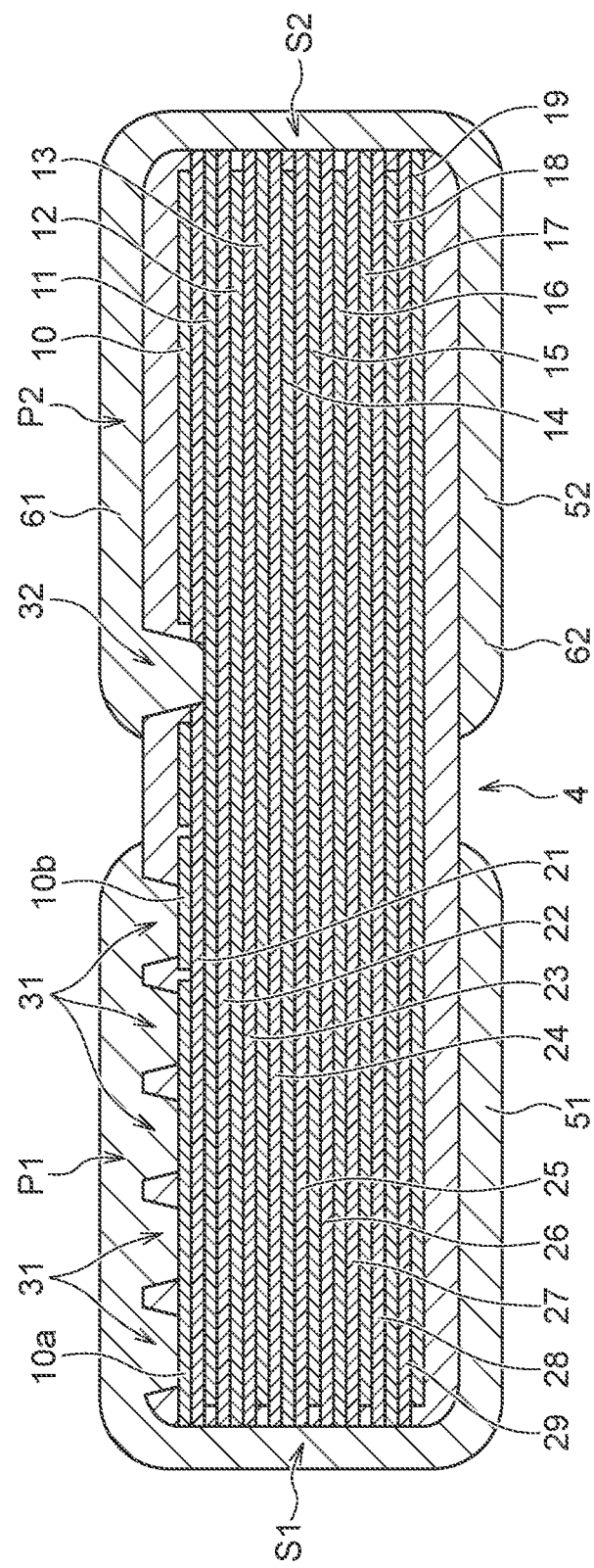
FIG. 6B is a schematic cross-sectional view of a multilayer capacitor according to a modification of the fourth embodiment.

A multilayer capacitor according to a fourth embodiment illustrated in FIG. 6A is featured in that the internal electrode layer 10 is divided into a part 10a exposed to the side surface S1 and a part 10b connected to the via conductor 31. As a result, the capacitor C1 is divided into a plurality of parallel-connected capacitors, thus further increasing the self-resonant frequency SRF1 of the capacitor C1. FIG. 6B is a schematic cross-sectional view of a multilayer capacitor according to a modification of the fourth embodiment. In the multilayer capacitor illustrated in FIG. 6B, a plurality of the via conductors 31 are provided for the internal electrode layer 10a. In the example of FIG. 6B, the number of the via conductors 31 is five.

Figure 7:
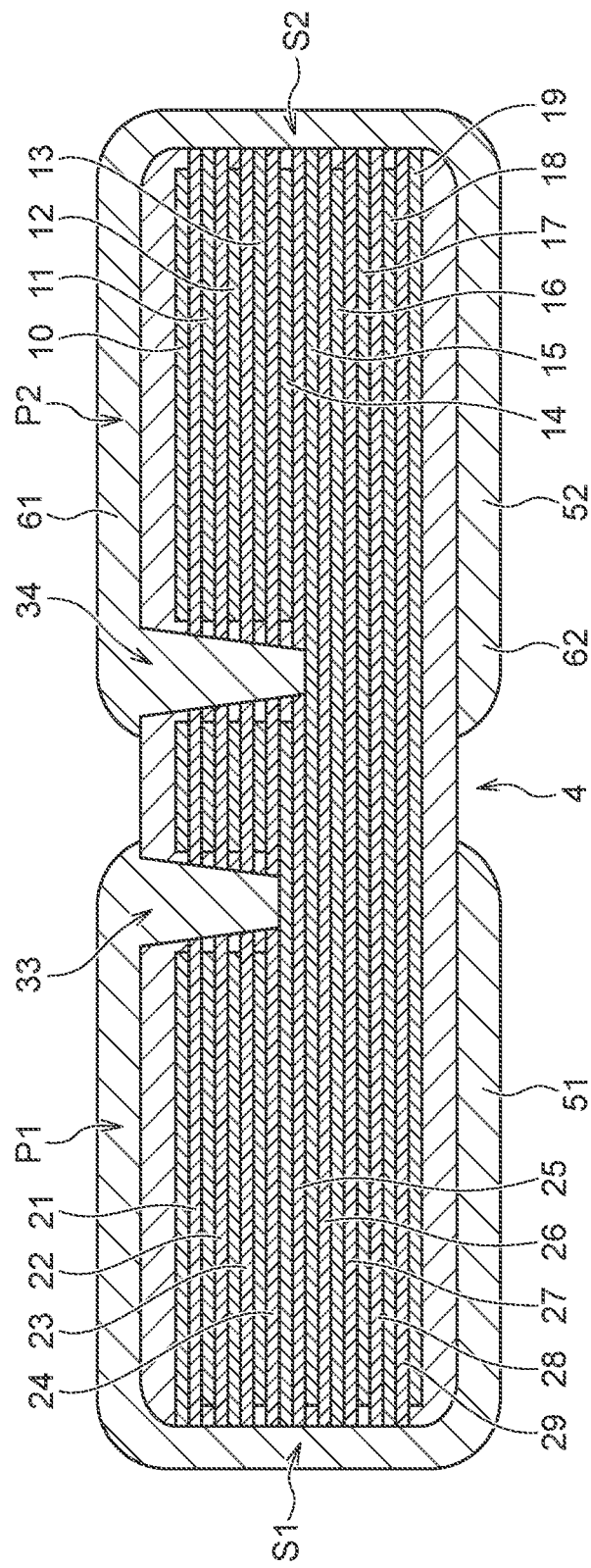
FIG. 7 is a schematic cross-sectional view of a multilayer capacitor according to a fifth embodiment of the present invention.

A multilayer capacitor according to a fifth embodiment illustrated in FIG. 7 is featured in that the external terminal 51 is connected to the internal electrode layer 14 through a via conductor 33 extending in the stacking direction, and the external terminal 52 is connected to the internal electrode layer 15 through a via conductor 34 extending in the stacking direction. As a result, the parasitic inductance L4 further decreases due to magnetic field cancelling effect, thus further increasing the self-resonant frequency SRF4 of the capacitor C4.

Figure 8A:
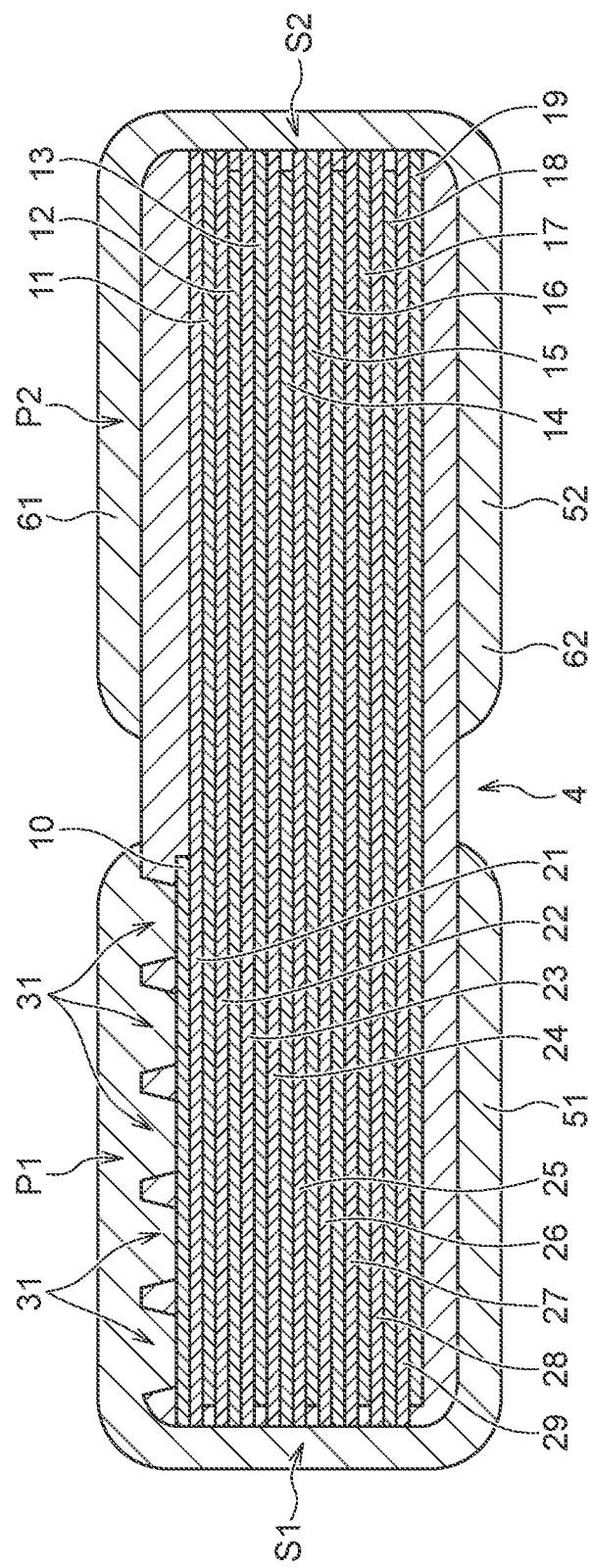
FIG. 8A is a schematic cross-sectional view of a multilayer capacitor according to a sixth embodiment of the present invention.
Figure 8B:
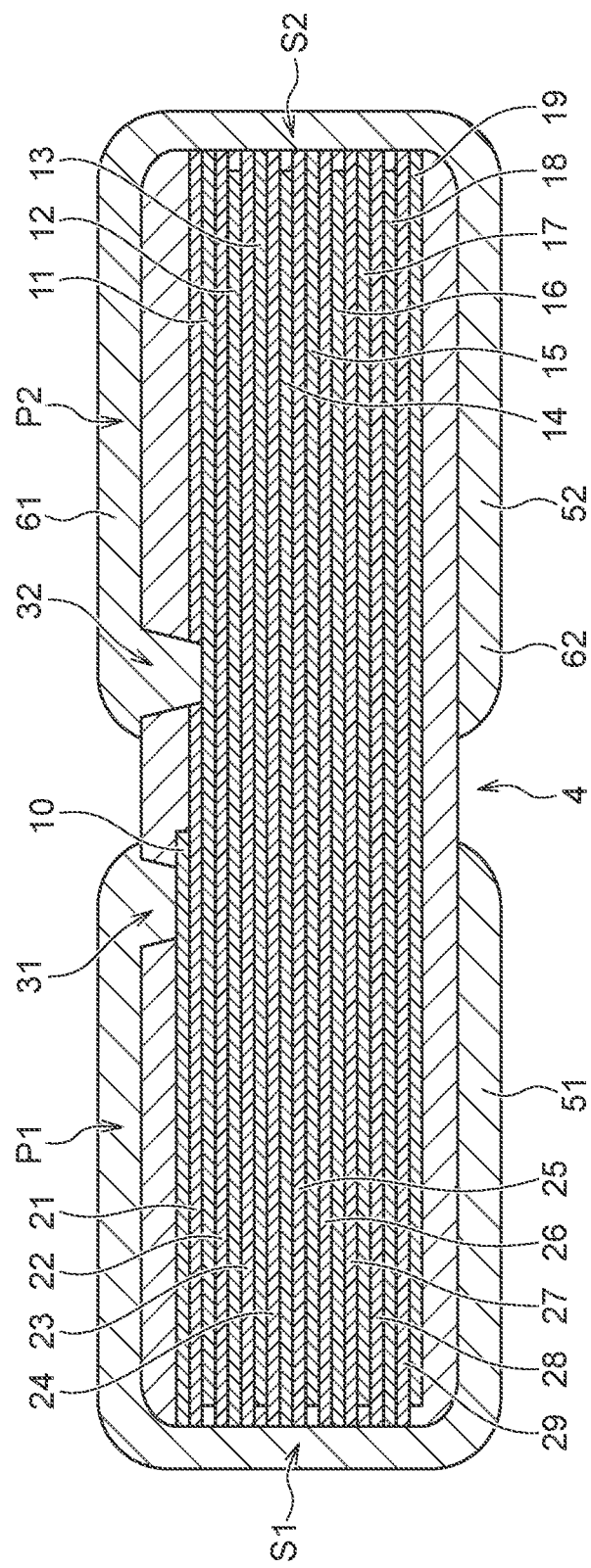
FIG. 8B is a schematic cross-sectional view of a multilayer capacitor according to a modification of the sixth embodiment.

A multilayer capacitor according to a sixth embodiment illustrated in FIG. 8A is featured in that the via conductor 32 is omitted, the via conductor 31 is provided in multiple numbers, and the internal electrode layer 10 is smaller in outer size than the internal electrode layers 11 to 19. This reduces the capacitance of the capacitor C1 to further increase the self-resonant frequency SRF1 of the capacitor C1. In the example illustrated in FIG. 8A, the number of the via conductors 31 is five. FIG. 8B is a schematic cross-sectional view of a multilayer capacitor according to a modification of the sixth embodiment. The multilayer capacitor illustrated in FIG. 8B has one via conductor 31 and one via conductor 32.

Figure 9A:
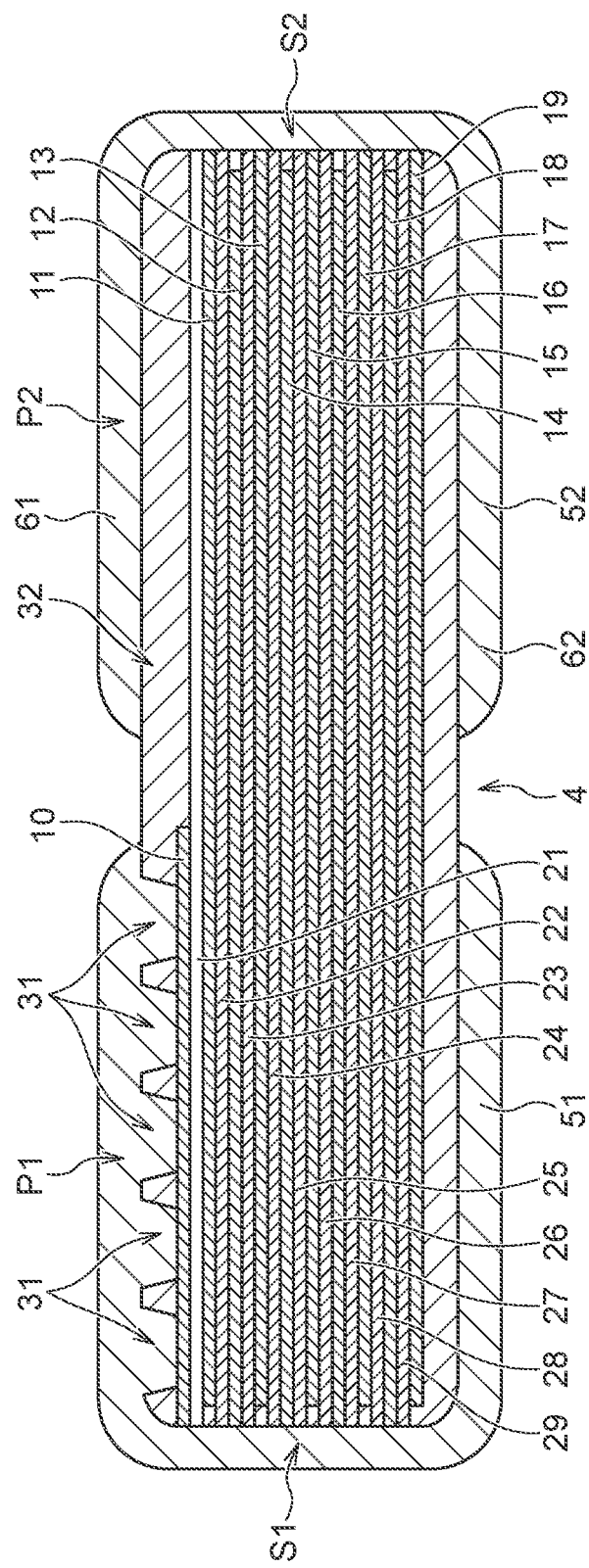
FIG. 9A is a schematic cross-sectional view of a multilayer capacitor according to a seventh embodiment of the present invention.

A multilayer capacitor according to a seventh embodiment illustrated in FIG. 9A is featured in that the via conductor 32 is omitted, the via conductor 31 is provided in multiple numbers, the internal electrode layer 10 is smaller in outer size than the internal electrode layers 11 to 19, and the dielectric layer 21 is lower in dielectric constant than the dielectric layers 22 to 29. This reduces the capacitance of the capacitor C1 to further increase the self-resonant frequency SRF1 of the capacitor C1. In the example illustrated in FIG.

Figure 9B:
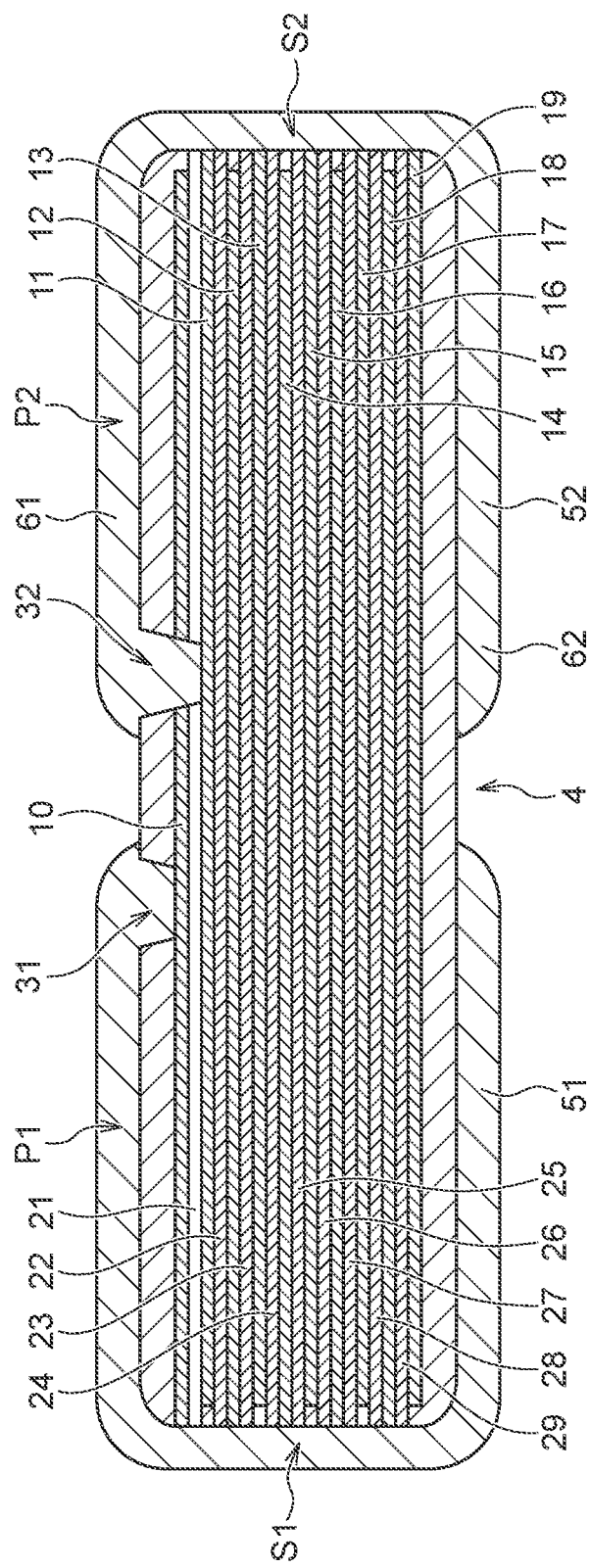
FIG. 9B is a schematic cross-sectional view of a multilayer capacitor according to a modification of the seventh embodiment.

9A, the number of the via conductors 31 is five. FIG. 9B is a schematic cross-sectional view of a multilayer capacitor according to a modification of the seventh embodiment. The multilayer capacitor illustrated in FIG. 9B has one via conductor 31 and one via conductor 32.

Figure 10:
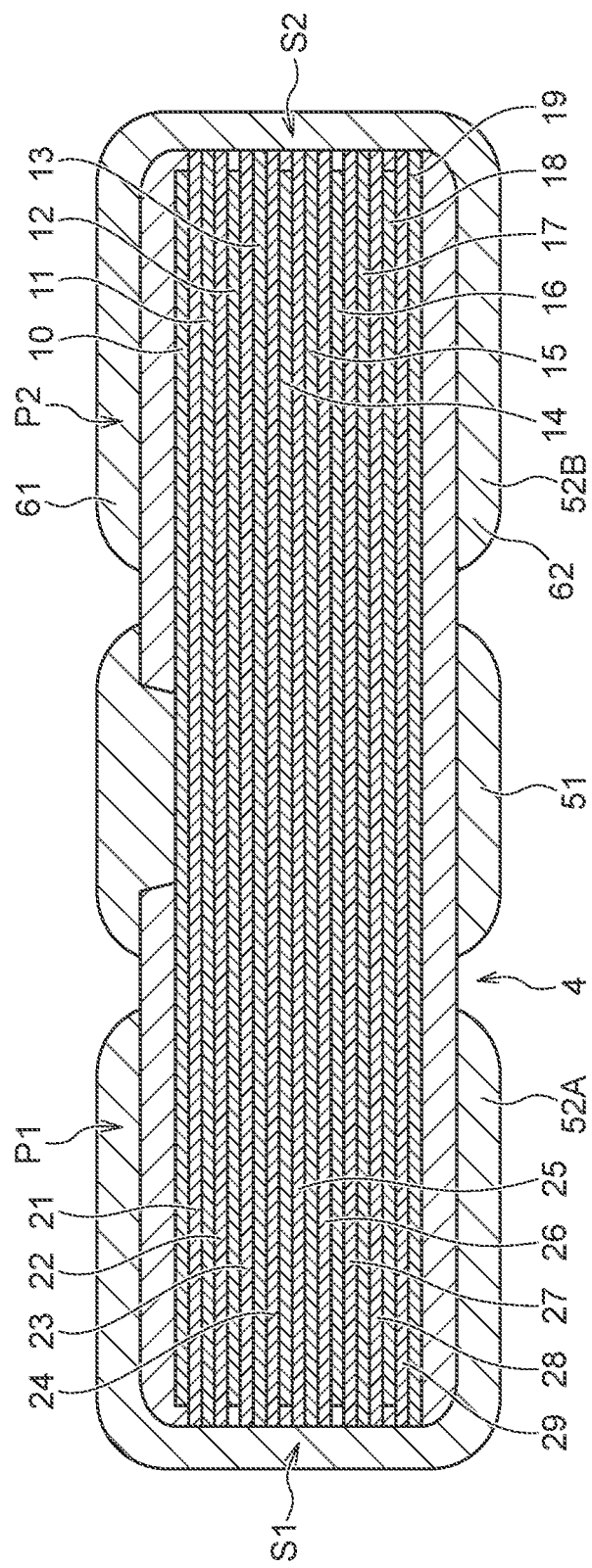
FIG. 10 is a schematic cross-sectional view of a multilayer capacitor according to an eighth embodiment of the present invention.

A multilayer capacitor according to an eighth embodiment illustrated in FIG. 10 is featured in that the internal electrode layers 11, 13, 15, 17, and 19 are each exposed to both the side surfaces S1 and S2 so as to be connected to an external terminal 52A at the side surface S1 and to an external terminal 52B at the side surface S2. The external terminal 51 is connected to the internal electrode layers 10, 12, 14, 16, and 18 exposed to another surface (not illustrated) and to the internal electrode layer 10 through the via conductor 31. Thus, a plurality of external terminals that receive the same level of potential may be provided.

While the preferred embodiments of the present invention have been described, the present invention is not limited to the above embodiments, and various modifications may be made within the scope of the present invention, and all such modifications are included in the present invention.

EXAMPLES

Figure 11:
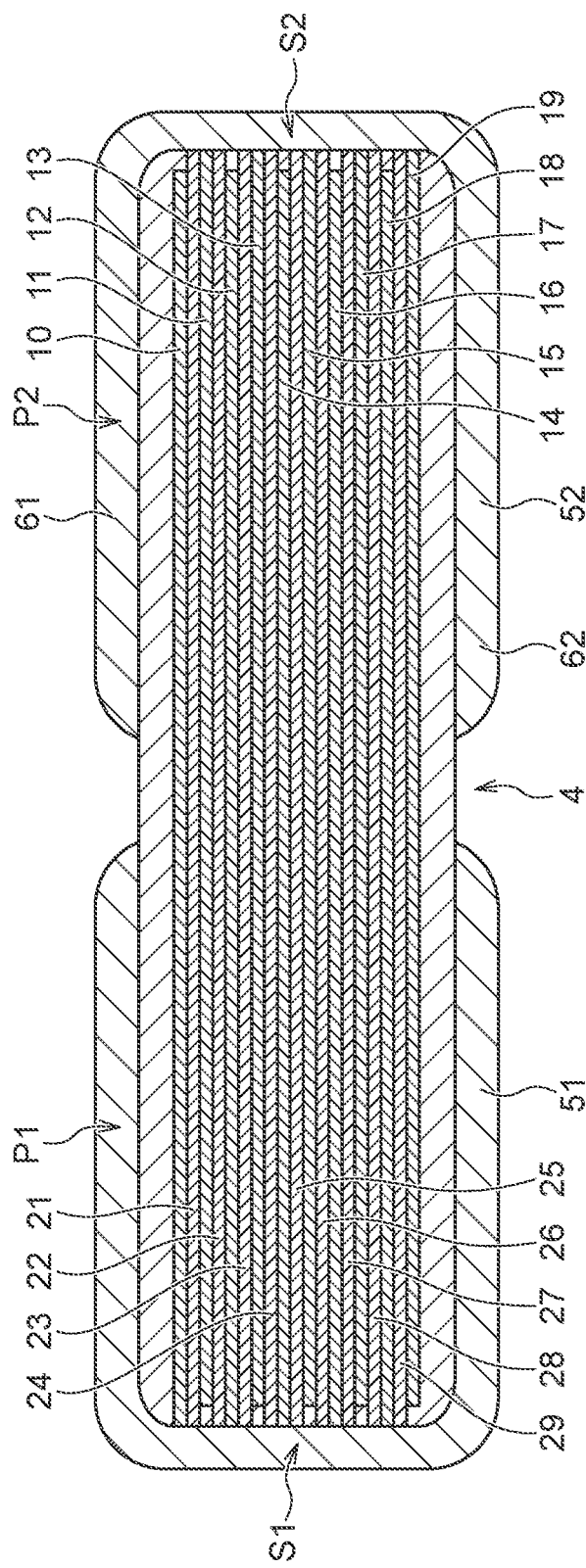
FIG. 11 is a schematic cross-sectional view of a multilayer capacitor according to a comparative example.

A multilayer capacitor according to a comparative example having the structure illustrated in FIG. 11 was assumed, and the capacitance, ESL, and self-resonant frequency thereof were calculated by simulation. The planer size of the multilayer capacitor was 1 mm×0.5 mm. The area of each of the internal electrode layers 10 to 19 was 0.442 mm$^2$. The dielectric constant ε of each of the dielectric layers 21 to 29 was 1254. As illustrated in FIG. 12, the capacitance, ESL, and self-resonant frequency of the multilayer capacitor according the comparative example were 272.2 nF, 44.8 pH, and 12.2 MHz, respectively.

A multilayer capacitor according to Example 1 having the structure illustrated in FIG. 1B was assumed, and the capacitance, ESL, and self-resonant frequency thereof were calculated by simulation. The parameters of the multilayer capacitor according to Example 1 were the same as those of the multilayer capacitor according to the above comparative example except that the first via conductor 31 was provided. The diameter of the first via conductor 31 was 0.008 mm$^2$. As illustrated in FIG. 12, the capacitance, ESL, and self-resonant frequency of the multilayer capacitor according Example 1 were 272 nF, 19.2 pH, and 29 MHz, respectively. Thus, the multilayer capacitor according to Example 1 had a smaller ESL and a higher self-resonant frequency than those of the multilayer capacitor according to the comparative example.

A multilayer capacitor according to Example 2 having the structure illustrated in FIG. 1A was assumed, and the capacitance, ESL, and self-resonant frequency thereof were calculated by simulation. The parameters of the multilayer capacitor according to Example 2 were the same as those of the multilayer capacitor according to Example 1 except that the second via conductor 32 was additionally provided. The diameter of the second via conductor 32 was 0.008 mm$^2$. The distance W between the first and second via conductors 31 and 32 was 0.14 mm. As illustrated in FIG. 12, the capacitance, ESL, and self-resonant frequency of the multilayer capacitor according Example 2 were 271.6 nF, 6.4 pH, and 87 MHz, respectively. Thus, the multilayer capacitor according to Example 2 had a smaller ESL and a higher self-resonant frequency than those of the multilayer capacitor according to Example 1.

A multilayer capacitor according to Example 3 having the structure illustrated in FIG. 4 was assumed, and the capacitance, ESL, and self-resonant frequency thereof were calculated by simulation. The parameters of the multilayer capacitor according to Example 3 were the same as those of the multilayer capacitor according to Example 2 except that the diameter of the first via conductor 31 was increased to 0.084 mm$^2$. As illustrated in FIG. 12, the capacitance, ESL, and self-resonant frequency of the multilayer capacitor according Example 3 were 271.6 nF, 4.2 pH, and 112 MHz, respectively. Thus, the multilayer capacitor according to Example 3 had a smaller ESL and a higher self-resonant frequency than those of the multilayer capacitor according to Example 2.

A multilayer capacitor according to Example 4 having the structure illustrated in FIG. 5 was assumed, and the capacitance, ESL, and self-resonant frequency thereof were calculated by simulation. The parameters of the multilayer capacitor according to Example 4 were the same as those of the multilayer capacitor according to Example 2 except that the number of the first via conductors 31 was five, and the total diameter of the first via conductors 31 was 0.039 mm$^2$. As illustrated in FIG. 12, the capacitance, ESL, and self-resonant frequency of the multilayer capacitor according Example 4 were 269.4 nF, 6.4 pH, and 110 MHz, respectively. Thus, the multilayer capacitor according to Example 4 had a higher self-resonant frequency than the multilayer capacitor according to Example 2.

A multilayer capacitor according to Example 5 having the structure illustrated in FIG. 6B was assumed, and the capacitance, ESL, and self-resonant frequency thereof were calculated by simulation. The parameters of the multilayer capacitor according to Example 5 were the same as those of the multilayer capacitor according to Example 4 except that the internal electrode layer 10 was divided into two parts of the internal electrode layers 10a and 10b, and the areas of the internal electrode layers 10a and 10b were 0.382 mm$^2$ and 0.043 mm$^2$, respectively. As illustrated in FIG. 12, the capacitance, ESL, and self-resonant frequency of the multilayer capacitor according to Example 5 were 266.7 nF, 6.4 pH, and 132 MHz, respectively. Thus, the multilayer capacitor according to Example 5 had a higher self-resonant frequency than the multilayer capacitor according to Example 4.

A multilayer capacitor according to Example 6 having the structure illustrated in FIG. 7 was assumed, and the capacitance, ESL, and self-resonant frequency thereof were calculated by simulation. The parameters of the multilayer capacitor according to Example 6 were the same as those of the multilayer capacitor according to Example 2 except that the first and second via conductors 31 and 32 were connected respectively to the internal electrode layers 14 and 15. As illustrated in FIG. 12, the capacitance, ESL, and self-resonant frequency of the multilayer capacitor according Example 6 were 254 nF, 4.9 pH, and 122 MHz, respectively. Thus, the multilayer capacitor according to Example 6 had a smaller ESL and a higher self-resonant frequency than the multilayer capacitor according to Example 2.

A multilayer capacitor according to Example 7 having the structure illustrated in FIG. 8B was assumed, and the capacitance, ESL, and self-resonant frequency thereof were calculated by simulation. The parameters of the multilayer capacitor according to Example 7 were the same as those of the multilayer capacitor according to Example 2 except that the area of the internal electrode layer 10 was reduced to 0.25 mm$^2$. As illustrated in FIG. 12, the capacitance, ESL, and self-resonant frequency of the multilayer capacitor according Example 7 were 245 nF, 6.2 pH, and 126 MHz, respectively. Thus, the multilayer capacitor according to Example 7 had a smaller ESL and a higher self-resonant frequency than the multilayer capacitor according to Example 2.

A multilayer capacitor according to Example 8 having the structure illustrated in FIG. 9B was assumed, and the capacitance, ESL, and self-resonant frequency thereof were calculated by simulation. The parameters of the multilayer capacitor according to Example 8 were the same as those of the multilayer capacitor according to Example 2 except that a material having a dielectric constant ε of 621 was used for the dielectric layer 21. As illustrated in FIG. 12, the capacitance, ESL, and self-resonant frequency of the multilayer capacitor according Example 8 were 258.7 nF, 6.3 pH, and 118 MHz, respectively. Thus, the multilayer capacitor according to Example 8 had a smaller ESL and a higher self-resonant frequency than the multilayer capacitor according to Example 2.

What is claimed is:

1. A multilayer capacitor comprising:
a capacitor layer having a plurality of alternately stacked internal electrode layers and dielectric layers; and
first and second external terminals,
wherein the plurality of internal electrode layers include:
a plurality of odd-numbered electrode layers which are positioned at odd-numbered rows and include a first internal electrode layer; and
a plurality of even-numbered electrode layers which are positioned at even-numbered rows and include a second internal electrode layer adjacent to the first internal electrode layer,
wherein the capacitor layer includes:
a first side surface to which the plurality of odd-numbered electrode layers are exposed;
a second side surface to which the plurality of even-numbered electrode layers are exposed; and
first and second planar regions that overlap the plurality of internal electrode layers in a plan view,
wherein the first external terminal covers the first side surface so as to be connected to the plurality of odd-numbered electrode layers,
wherein the second external terminal covers the second side surface so as to be connected to the plurality of even-numbered electrode layers,
wherein the first external terminal covers also the first planar region and is connected to the first internal electrode layer through a first via conductor extending in a stacking direction of the plurality of internal electrode layers and dielectric layers,
wherein the second external terminal also covers the second planar region and is connected to the second internal electrode layer through a second via conductor extending in the stacking direction,
wherein a diameter of the first via conductor is larger than a diameter of the second via conductor, and
wherein each of the first and second via conductors is tapered.

2. The multilayer capacitor as claimed in claim 1, wherein the first internal electrode layer is positioned at an end of the capacitor layer.

3. The multilayer capacitor as claimed in claim 2, wherein a number of the first via conductors is larger than a number of the second via conductors.

4. The multilayer capacitor as claimed in claim 2, wherein the first internal electrode layer is divided into a first part exposed to the first side surface and a second part connected to the first via conductor by a slit.

5. The multilayer capacitor as claimed in claim 1, wherein neither the first nor second internal electrode layer is located at an end of the capacitor layer.

6. The multilayer capacitor as claimed in claim 1, wherein an outer size of the first internal electrode layer is smaller than an outer size of the second internal electrode layer.

7. The multilayer capacitor as claimed in claim 1, wherein on of the dielectric layers positioned between the first and second internal electrode layers has a dielectric constant lower than those of the dielectric layers positioned between other internal electrode layers.

8. The multilayer capacitor as claimed in claim 1, wherein one of the first and second external terminals is a single terminal, and other of the first and second external terminals is divided into a plurality of terminals.

9. The multilayer capacitor as claimed in claim 1, wherein a diameter of the first via conductor is larger than a depth thereof.

10. The multilayer capacitor as claimed in claim 4, wherein the first external terminal is connected to the first part of the first internal electrode layer through a third via conductor extending in the stacking direction.

11. A multilayer capacitor comprising:
a capacitor layer having a plurality of alternately stacked internal electrode layers and dielectric layers; and
first and second external terminals,
wherein the plurality of internal electrode layers include:
a plurality of odd-numbered electrode layers which are positioned at odd-numbered rows and include a first internal electrode layer; and
a plurality of even-numbered electrode layers which are positioned at even-numbered rows,
wherein the capacitor layer includes:
a first side surface to which the plurality of odd-numbered electrode layers are exposed;
a second side surface to which the plurality of even-numbered electrode layers are exposed; and
a top surface having a first planar region that overlaps the first internal electrode layer in a plan view,
wherein the first external terminal covers the first side surface so as to be connected to the plurality of odd-numbered electrode layers and covers the first planar region so as to be connected to the first internal electrode layer through a first via conductor extending in a stacking direction of the plurality of internal electrode layers and dielectric layers,
wherein the second external terminal covers the second side surface so as to be connected to the plurality of even-numbered electrode layers,
wherein a diameter of the first via conductor is larger than a depth thereof,
wherein the even-numbered electrode layers include a second internal electrode layer,
wherein the top surface further has a second planar region that overlaps the second internal electrode layer in a plan view,
wherein the second external terminal further covers the second planar region so as to be connected to the second internal electrode layer through a second via conductor extending in the stacking direction, and
wherein each of the first and second via conductors is tapered.

12. The multilayer capacitor as claimed in claim 11, wherein a distance between the first and second via conductors is narrower than a distance between the first via conductor and the first side surface and narrower than a distance between the second via conductor and the second side surface.

13. The multilayer capacitor as claimed in claim 11, wherein a diameter of the first via conductor is larger than a diameter of the second via conductor.

14. The multilayer capacitor as claimed in claim 11, wherein an outer size of the first internal electrode layer is smaller than an outer size of the second internal electrode layer.

15. A multilayer capacitor comprising:
a capacitor layer having a plurality of alternately stacked internal electrode layers and dielectric layers; and
first and second external terminals,
wherein the plurality of internal electrode layers include:
a plurality of odd-numbered electrode layers which are positioned at odd-numbered rows and include a first internal electrode layer; and
a plurality of even-numbered electrode layers which are positioned at even-numbered rows,
wherein the capacitor layer includes:
a first side surface to which the plurality of odd-numbered electrode layers are exposed;
a second side surface to which the plurality of even-numbered electrode layers are exposed; and
a top surface having a first planar region that overlaps the first internal electrode layer in a plan view,
wherein the first external terminal covers the first side surface so as to be connected to the plurality of odd-numbered electrode layers and covers the first planar region so as to be connected to the first internal electrode layer through a first via conductor extending in a stacking direction of the plurality of internal electrode layers and dielectric layers,
wherein the second external terminal covers the second side surface so as to be connected to the plurality of even-numbered electrode layers,
wherein a diameter of the first via conductor is larger than a depth thereof,
wherein the first internal electrode layer has a slit that divides the first internal electrode layer into first and second parts,
wherein the first part contacts a part of the first external terminal covering the first side surface without contacting the first via conductor, and
wherein the second part contacts the first via conductor without contacting the part of the first external terminal covering the first side surface.

16. The multilayer capacitor as claimed in claim 15, wherein an outer size of the first part is greater than an outer size of the second part.

* * * * *